United States Patent
Blackburn et al.

(10) Patent No.: US 7,263,648 B2
(45) Date of Patent: Aug. 28, 2007

(54) APPARATUS AND METHOD FOR ACCOMMODATING LOSS OF SIGNAL

(75) Inventors: Dennis Blackburn, Suwanee, GA (US); Kenneth Osburn, Suwanee, GA (US); Robert Buggy, Duluth City, GA (US); Weihong Tan, Alpharetta, GA (US)

(73) Assignee: Wegener Communications, Inc., Duluth, GA (US)

( * ) Notice: Subject to any disclaimer, the term of this patent is extended or adjusted under 35 U.S.C. 154(b) by 581 days.

(21) Appl. No.: 10/350,930

(22) Filed: Jan. 24, 2003

(65) Prior Publication Data

US 2004/0148555 A1 Jul. 29, 2004

(51) Int. Cl.
*G11C 29/00* (2006.01)
*G06F 13/00* (2006.01)

(52) U.S. Cl. ......................................... 714/763; 710/52
(58) Field of Classification Search ................ 714/718, 714/763; 725/68; 365/230.08; 710/52
See application file for complete search history.

(56) References Cited

U.S. PATENT DOCUMENTS

| | | | |
|---|---|---|---|
| 4,985,895 A | 1/1991 | Pelkey | 371/37.7 |
| 5,019,910 A | 5/1991 | Filmer | 358/188 |
| 5,367,571 A | 11/1994 | Bowen et al. | 380/20 |
| 5,404,505 A | 4/1995 | Levinson | 395/600 |
| 5,421,017 A | 5/1995 | Scholz et al. | 395/700 |
| 5,440,632 A | 8/1995 | Bacon et al. | 380/20 |
| 5,550,576 A | 8/1996 | Klosterman | 348/6 |
| 5,684,525 A | 11/1997 | Klosterman | 348/12 |
| 5,694,334 A | 12/1997 | Donahue et al. | 364/514 R |
| 5,712,969 A | 1/1998 | Zimmermann et al. | 395/182.03 |
| 5,717,887 A | 2/1998 | Leslie | 395/439 |
| 5,764,773 A | 6/1998 | Nishiura | 380/49 |

(Continued)

FOREIGN PATENT DOCUMENTS

EP 0 993 183 A2 4/2000

(Continued)

OTHER PUBLICATIONS

Jun. 23, 2006, Notification of Transmittal of The International Search Report and The Written Opinion of the International Searching Authority, or the Declaration.

(Continued)

*Primary Examiner*—James C Kerveros
(74) *Attorney, Agent, or Firm*—Husch & Eppenberger LLC; Robert C. Haldiman

(57) ABSTRACT

A memory control system for a network that broadcasts to multiple terminals content data including music, video and the like, and also including commercial advertisements. A memory in the terminal unit stores content data that is played upon a loss of signal from the broadcast network. The memory also stores commercial advertisements for playback from the terminal memory according to schedule control instructions, which are also stored in a memory at the terminal unit. Writing of content to a memory and reading content from the memory may be executed concurrently by interleaving. A microprocessor arbitrates use of input, output and memory buffers such that reading content from memory provides content output maintaining uninterrupted real time play even when new content data is being stored concurrently. Content data memory addresses are stored in sector tables that are further arranged in File Allocation Tables in a second memory.

24 Claims, 6 Drawing Sheets

U.S. PATENT DOCUMENTS

| | | | |
|---|---|---|---|
| 5,828,945 A | 10/1998 | Klosterman | 455/4.2 |
| 5,892,767 A | 4/1999 | Bell et al. | 370/432 |
| 5,917,915 A | 6/1999 | Hirose | 380/49 |
| 5,923,362 A | 7/1999 | Klosterman | 348/12 |
| 5,930,515 A | 7/1999 | Ducharme et al. | 395/712 |
| 5,987,518 A | 11/1999 | Gotwald | 709/230 |
| 5,987,519 A | 11/1999 | Peifer et al. | 709/230 |
| 5,999,654 A * | 12/1999 | Toujima et al. | 382/232 |
| 6,067,300 A * | 5/2000 | Baumert et al. | 370/413 |
| 6,072,983 A | 6/2000 | Klosterman | 455/4.2 |
| 6,094,671 A | 7/2000 | Chase et al. | 709/201 |
| 6,097,662 A * | 8/2000 | Itou | 365/230.03 |
| 6,101,180 A | 8/2000 | Donahue et al. | 370/352 |
| 6,113,652 A | 9/2000 | Lysik et al. | 717/11 |
| 6,182,187 B1 | 1/2001 | Cox et al. | 711/5 |
| 6,262,982 B1 | 7/2001 | Donahue et al. | 370/352 |
| 6,266,339 B1 | 7/2001 | Donahue et al. | 370/432 |
| 6,266,810 B1 | 7/2001 | Tanaka et al. | 717/11 |
| 6,317,162 B1 | 11/2001 | Matsumoto | 348/553 |
| 6,331,876 B1 | 12/2001 | Koster et al. | 348/725 |
| 6,343,379 B1 | 1/2002 | Ozawa et al. | 725/63 |
| 6,378,129 B1 | 4/2002 | Zetts | |
| 6,385,647 B1 | 5/2002 | Willis et al. | 709/217 |
| 6,393,585 B1 | 5/2002 | Houha et al. | |
| 6,401,242 B1 | 6/2002 | Eyer et al. | 725/35 |
| 6,411,616 B1 | 6/2002 | Donahue et al. | 370/352 |
| 6,470,496 B1 | 10/2002 | Kato et al. | 717/173 |
| 6,487,721 B1 | 11/2002 | Safadi | 725/36 |
| 6,557,052 B1 * | 4/2003 | Kubo | 710/23 |
| 2001/0003846 A1 | 6/2001 | Rowe et al. | 725/47 |
| 2001/0005902 A1 | 6/2001 | Bacon et al. | 725/50 |
| 2001/0043573 A1 | 11/2001 | Kelly | 370/316 |
| 2001/0044934 A1 | 11/2001 | Hirai et al. | 717/11 |
| 2002/0000831 A1 | 1/2002 | Smith | 326/39 |
| 2002/0007494 A1 | 1/2002 | Hodge | 725/109 |
| 2002/0010936 A1 | 1/2002 | Adam | 725/91 |
| 2002/0010938 A1 | 1/2002 | Zhang et al. | 725/95 |
| 2002/0026645 A1 | 2/2002 | Son et al. | 725/117 |
| 2002/0034179 A1 | 3/2002 | Ollikainen et al. | 370/389 |
| 2002/0035730 A1 | 3/2002 | Ollikainen et al. | 725/93 |
| 2002/0047899 A1 | 4/2002 | Son et al. | 348/114 |
| 2002/0053073 A1 | 5/2002 | Shimamoto | 717/168 |
| 2002/0071434 A1 | 6/2002 | Furukawa | 370/392 |
| 2002/0105976 A1 | 8/2002 | Kelly et al. | 370/519 |
| 2002/0108124 A1 | 8/2002 | Sato | 725/136 |
| 2002/0108128 A1 | 8/2002 | Lash et al. | 725/148 |
| 2002/0120885 A1 | 8/2002 | Choi et al. | 714/38 |
| 2002/0124243 A1 | 9/2002 | Broeksteeg et al. | 717/168 |
| 2002/0131428 A1 | 9/2002 | Pecus et al. | 370/401 |
| 2002/0136218 A1 | 9/2002 | Cardoso, Jr. | 370/394 |
| 2002/0138852 A1 | 9/2002 | Reynolds et al. | 725/136 |
| 2002/0144291 A1 | 10/2002 | Smiley et al. | 725/120 |
| 2002/0150102 A1 | 10/2002 | Janko et al. | 370/392 |
| 2002/0152467 A1 | 10/2002 | Fiallos | 725/50 |
| 2002/0163935 A1 | 11/2002 | Paatela et al. | 370/466 |
| 2002/0184339 A1 | 12/2002 | Mackintosh et al. | 709/218 |
| 2002/0184642 A1 | 12/2002 | Lude et al. | 725/105 |
| 2002/0191640 A1 | 12/2002 | Haymes et al. | 370/466 |
| 2003/0003904 A1 * | 1/2003 | Matsumoto | 455/423 |
| 2003/0005037 A1 | 1/2003 | Aija et al. | 709/203 |
| 2003/0005444 A1 | 1/2003 | Crinon et al. | 725/50 |
| 2003/0009769 A1 | 1/2003 | Hensgen et al. | 725/131 |
| 2003/0012190 A1 | 1/2003 | Kaku et al. | 370/389 |
| 2003/0016664 A1 | 1/2003 | MeLampy et al. | 370/389 |

FOREIGN PATENT DOCUMENTS

| | | |
|---|---|---|
| JP | 2001136085 | 5/2001 |
| WO | WO98/54642 | 12/1998 |

OTHER PUBLICATIONS

MPEG-2 Transport Stream Description; Rev. 2.29.00, Compiled by Ron Wallace, 35pp, Dec. 29, 2000.

Optibase MGW 3100 Brochure (2001).

Optibase "Bridging DVB and IP Networks With Optibase's MGW 3100", 2001.

* cited by examiner

APPARATUS AND METHOD FOR ACCOMMODATING LOSS OF SIGNAL

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention is in the field of broadcast data networks, systems for receiving broadcast data and control systems for memory control and data playback.

2. Related Art

Network distribution of content data, particularly those using satellite broadcast, are in wide use for distributing programming for broadcast television, cable television, broadcast "satellite" radio and subscription music services for commercial retail outlets. The content data output at terminals typically includes content of varying types, for example music, and commercial content such as advertisements. Systems for controlling the scheduling, frequency, and distribution to all terminals, groups of terminals, or individual terminals are known, see U.S. Pat. No. 4,985,895 to Pelkey, incorporated by reference herein.

It is desirable that content data control instructions for the scheduling or rescheduling of content play at an individual terminal be stored at that terminal's receiver/decoder and player equipment. It is also useful that substituted content, for example a new commercial to replace an older commercial, be stored at terminal receiver units. For example, a group of retail outlets may subscribe to a satellite broadcast subscription service that includes the broadcast of music and commercial advertisements. Commercial advertisements for a particular retail chain, particular geographical area or for individual stores may be downloaded from a satellite along with scheduling instructions for interrupting music to play the commercial advertisements on a periodic schedule. If the commercial advertisement is to be changed, or its play schedule is to be changed, it is efficient to download to the retail outlets at which changes are to be executed the new content and/or new instructions so that they can be saved at the retail terminal and played from that terminal.

It is disadvantageous in broadcast networks to lose a signal. Signals may be lost for a wide variety of reasons, such as weather intervening between a broadcasting satellite and receivers, or such as damage to receiving equipment such as satellite dishes or cables. It is desirable that receiving units have a backup memory of content and be able to play that content during periods of time in which a signal is lost. Accordingly, memory for content and control instructions are also useful for purposes of backup play during loss of signal.

Various combinations of controllers and hard drives or controllers and memories, are known for other systems, such as the ATA/IDE standard. However, there is a need in the content data distribution industry for executing these capabilities at reduced costs.

Finally, there is a need in the industry for executing directly downlinked content data play, storing content data, replaying content data according to control instructions and replaying content data backup in response to a loss of signal, in a manner that is imperceptible to the human listener or viewer of the content.

SUMMARY OF THE INVENTION

It is in view of the above problems that the present invention was developed. The invention is a memory control system for a content data distribution network.

Specifically, the invention is a memory control system for network broadcasting to multiple terminals content data including music, video and the like, and also including commercial advertisements. A memory in the terminal unit stores backup content that is played upon a loss of signal from the broadcast network. The memory also stores commercial advertisements for playback from the terminal memory according to schedule control instructions, which are also stored in a memory at the terminal unit. Writing of content to a memory and reading content from the memory may be executed concurrently by interleaving. A microprocessor arbitrates use of input, output and memory buffers such that reading content from memory provides content output maintaining uninterrupted real time play even when new content data is being stored concurrently. A File Allocation Table data structure facilitates these functions.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
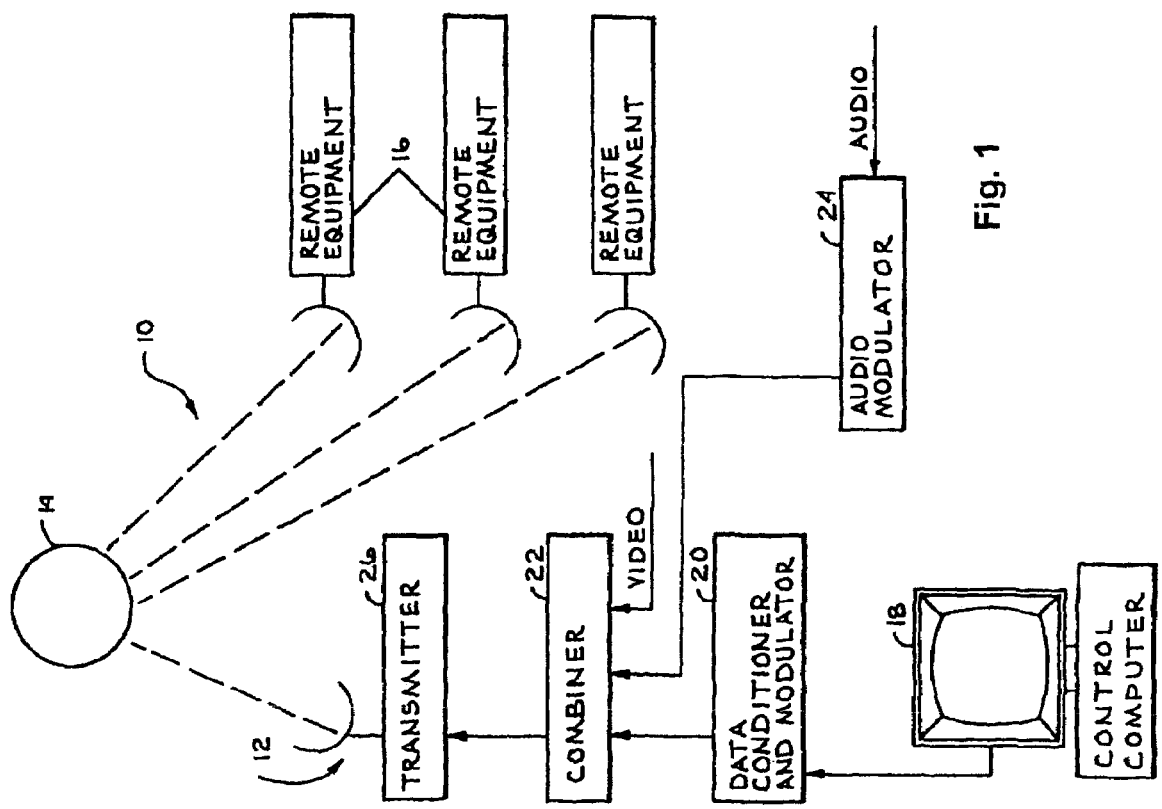
FIG. 1 is a block diagram illustrating a satellite distribution network.

Referring now to the figures in which like reference numbers correspond to like elements, FIG. 1 is a block diagram of a satellite distribution network for content data such as music. In the satellite distribution network 10, content data is generated at the uplink 12 and transmitted along with control instructions via the satellite 14 to terminal receivers 16. Uplink 12 includes a control computer 18, a conditioning and modulation circuit 20 and a combiner circuit 22 for receiving audio and/or video signals. Combined audio and/or video content, together with control instructions, are output from combiner 22 to transmitter 26 whereupon they are uplinked to satellite 14. Satellite 14 retransmits the content data and control instructions in a broadcast received by remote equipment 16. Remote equipment will include a terminal having a receiver/decoder. Terminals incorporated in the present invention will include memory control system circuitry that works in conjunction with the content data and control instructions received.

In the embodiment depicted in the following figures, broadcast content data is music transmitted according to the MPEG protocol in asynchronous transfer mode. It will also include commercial data such as advertisements. Those skilled in the art will appreciate that other content data, for example video, transmitted according to other protocols and in other modes will also benefit from the incorporation of the memory control system of the present invention and are considered to be within the scope of the present invention. Likewise, commercial "content" will be understood to include advertisements, promotions, announcements and any other form of communication with the ultimate listeners or viewers. Content data will also be understood to include code enabling interoperability with and communication through various broadcast communication devices, such as PCs, PDAs, radios, televisions, wireless telephones and the like.

Figure 2:
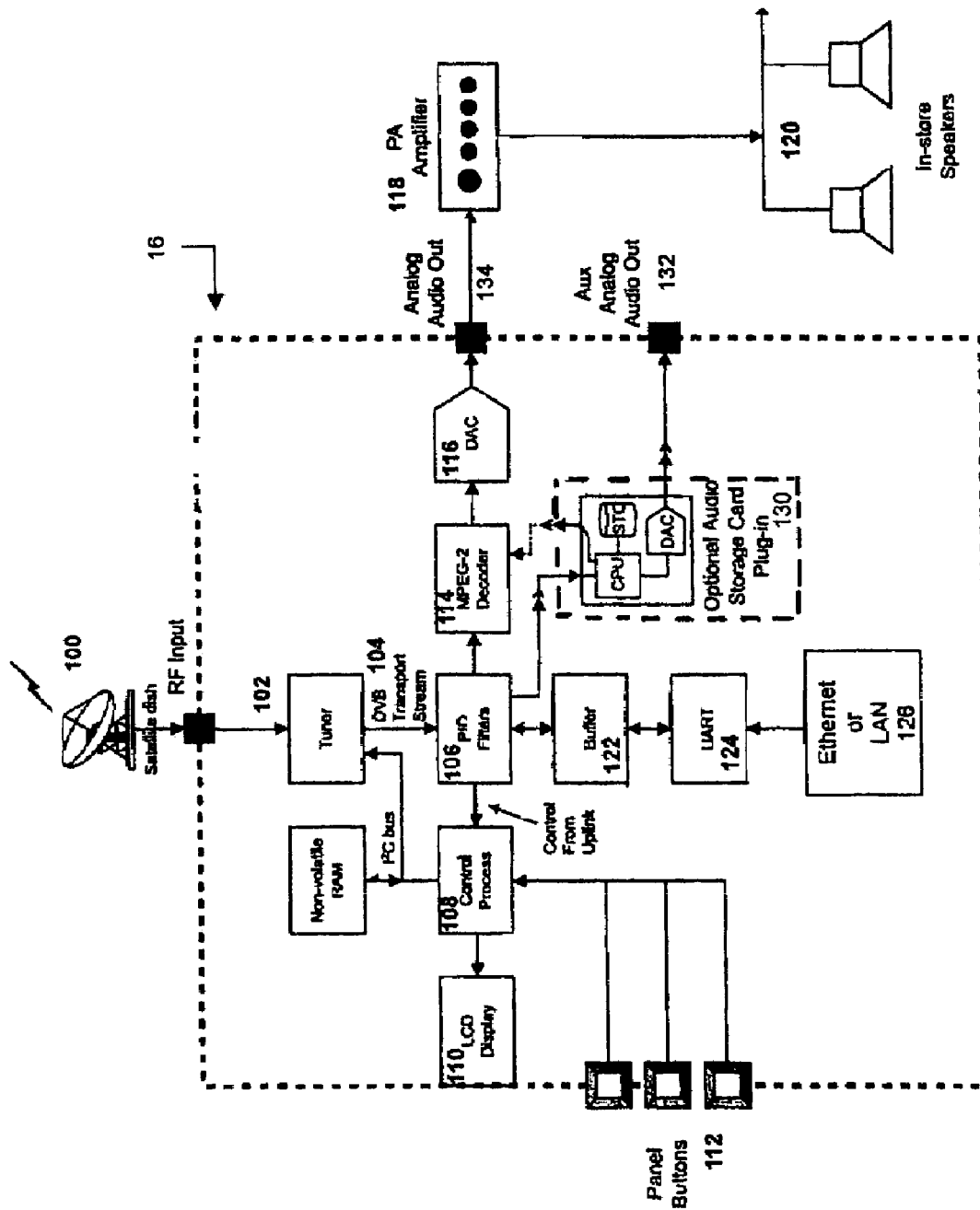
FIG. 2 is a block diagram of a decoder unit.

FIG. 2 is a block diagram illustrating the general configuration of a terminal unit receiver and decoder. Remote equipment 16 includes a satellite dish for receiving the broadcast signal, 100. Multiple channels connect the satellite dish 100 with tuner 102 for receipt of one or more streams of data through radio frequency input. From tuner 102 digital video bus 104 allows transfer of data to packet identification filter processor 106.

Packets containing control instructions may be forwarded to control processor 108. Control processor 108 may be interactive with a user through an LCD display 110 and panel buttons 112. Content, for example music, packets are received by an MPEG 2 decoder 114. After decoding, content data is forwarded to digital analog converter 116 where it is output to a standard amplifier 118 for playing the music content over speakers 120.

Packets are also forwarded to buffer 122 and therethrough interconnected with a synchronous transfer mode reassembler UART 124. From there an ethernet or LAN connection is available.

The memory control system circuitry of the present invention is indicated in FIG. 2 at 130. The system may be on a separate option card, or an integral part of the main circuit board. The system is detailed in FIG. 3. The memory control system may output to its own analogue out 132 or to back to decoder 114 and analogue out 134.

Figure 3:
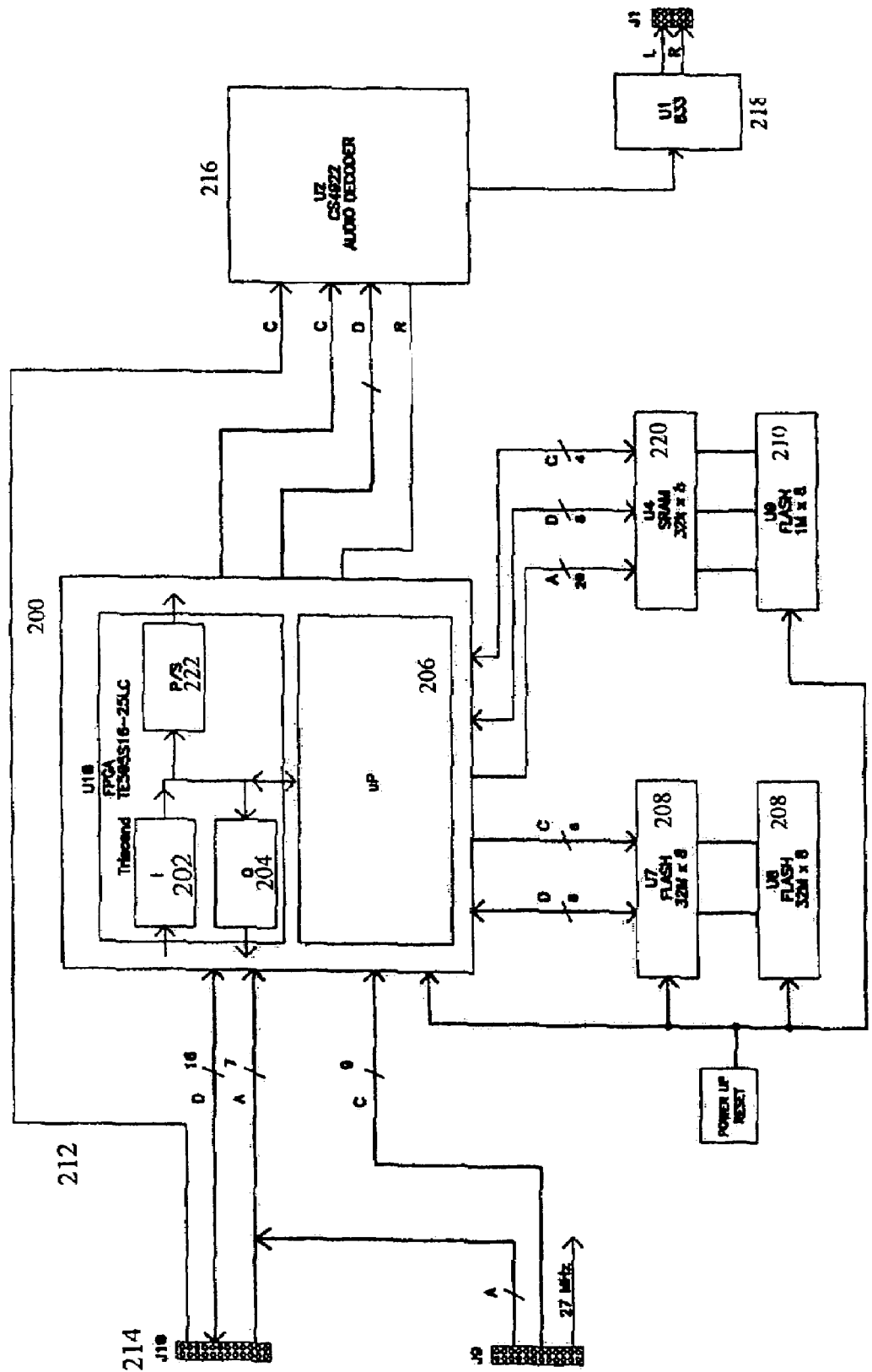
FIG. 3 is a block diagram of a memory control system.

FIG. 3 is a block diagram of one embodiment of a memory control system according to the present invention. In the depicted embodiment a Triscend™ model Configurable System On a Chip has been used. The same hereinafter disclosed logic executed by CSOC chips, or other combinations of micro processors and buffers will be understood to be within the scope of the present invention. These will be understood to include SOCs, systems on chips, dedicated ASICs, or any chip including a microprocessor and configurable gates, or any chip including a microprocessor and gates already configured as described herein.

In the embodiment depicted in FIG. 3, CSOC chip 200 is a field programmable gate array configured to include an input buffer 202 and an output buffer 204. In the depicted embodiment each buffer may have at least a 2000 byte capacity but not more than 8000 bytes. Other embodiments at other data transfer rates may have other buffer capacities. The chip also includes micro processing capabilities 206.

Through CSOC chip 200 at least two flash memories and an SRAM are controlled. Content data is stored in flash memory 208. Additional flash memories 208 may be added to expand capacity. Control instructions and File Allocation Tables are stored in flash memory 210. The executable logic of the memory control system is stored in non-volatile flash memory 210. Upon power up, the executable logic is loaded into SRAM 220. Executing out of SRAM 220 allows new control instructions and FAT addresses to be stored in memory 210 during use.

The remote equipment includes a circuit 212 from the clock oscillator in the receiver depicted in FIG. 2. The MPEG audio decoder 216 decodes and synchronizes audio at a standard frequency (27 MHz), and circuit 212 supplies that to decoder 216. From there audio is output to speakers 218.

The memory control system circuitry of the present invention, as for example that depicted in FIG. 3, makes possible memory control without necessitating the use of expensive ATA-IDE type controllers. The present invention enables several modes of operation that were previously only enabled by use of ATA-IDE controllers. These modes include play back of stored content data, such as music, for use during loss of signal, and concurrent storage of new content data, such as commercials, during play back of other stored music or commercials. These modes of operation are enabled by the interleaving capabilities of the present invention.

Interleaving is a multiplexing operation that allows simultaneous reading and writing of memory, for example flash memory, without interruption of the flow of content data, such as music, through the receiver/decoder terminal unit. Accordingly, new content data may be stored in a manner that is imperceptible to a person listening to the output of "live" music broadcasts, or even to a person listening to replay of other stored content data. Real time content data output is maintained.

Content data such as songs, videos or advertisements are broken up into multiple segments for transmission, reading, writing and storage. When a new content data segment is received by CSOC chip 200, it enters the input buffer 202. Microprocessor 206 executes write logic instructions and moves the content data segment to the output buffer 204. When this buffer is full, micro processor 206 writes the new content data segment to the intake buffer of a flash memory. When the flash memory buffer is full, the contents are stored in a segment of a flash memory 208. Obviously, most content data is comprised of multiple segments. Accordingly, as a first segment of new content data moves from the input buffer to the output buffer, a second segment is loaded to the input buffer. When the first segment moves to the memory buffer, the second segment moves to the CSOC output buffer and a third segment is loaded to the input buffer, and so on until storage of all segments is complete.

The address segment is separately stored, through micro processor 206, and written to separate flash memory 210 in the File Allocation Tables there. Using this path for data flow, the memory control system may store any type of content data received over the broadcast network.

The memory control system reads stored content data along the same path. The micro processor 206 will call up a stored content data segment location from the File Allocation Table stored in flash memory 210 and then retrieve that stored content data segment from flash memory 208. That content is received in CSOC input buffer 202, forwarded to the output buffer 204 and then out to the decoder and player. Parallel/serial shift register 222 is comprised of configurable gates in the depicted embodiment. They are configured to output data to decoder 216 in MPEG logic compatible form.

Interleaving is the multiplexing process by which the memory control system alternates the reading and writing of memory in a manner that is perceived to be simultaneous and imperceptible to a person listening to or watching the content data. Hence, the memory control system provides a data output that maintains real time play. Content data segments are alternatively routed through the buffers for perceptibly simultaneous storage and play back. In this manner, memory may be concurrently written and read in a manner perceived as simultaneous, in spite of the fact that some memories, for example flash memory, are incapable of literal simultaneous reading and writing at the same instant.

In the depicted embodiment, groups of content data that are 2000 bytes in size, when transferred at a 64K data rate, correspond to approximately ¼ second of MPEG encoded music. Of course, those skilled in the art will appreciate that other quantums of data, other data transfer rates and other buffer capacities are within the scope of the present invention. It will also be appreciated that read, write and storage rates need not be identical, or even approximately equivalent. The rate of writing data to a memory buffer may be an order of magnitude slower than the rate of storing that data from the buffer to the memory. Read rates may vary by a factor of two or more from write rates. All read, write and storage rates are considered to be within the scope of the present invention.

The memory control system enables at least five different modes of operation for remote terminals playing content data broadcast over a network. First, as previously indicated, a normal "live" mode of operation is enabled to bypass the memory circuitry altogether. Of course, it is possible to broadcast multiple types of data, for example music and commercials, over a first channel for direct "live" playing. However, it is advantageous to use memory. One advantage to memory is that a second type of content data, for example a commercial, may be stored in memory along with control instructions for its scheduling. Hence, a central uplink facility need broadcast a new commercial only once. Thereafter the control instructions broadcast with the commercial will be saved by the remote terminals to which it is directed. It will be played automatically out of memory according to the control instructions. Accordingly, playing content data from memory is a second mode of operation.

In the mode of playing a "live" music feed over a first channel and interrupting it according to a preconfigured schedule with content data of a second type, for example commercials, from memory, the memory control system will simply order that the "live" music fade and that the second type of content data, the commercial, be recalled from memory and fed to the amplifier for play.

From time to time it will occur that a broadcast of content data with new control instructions will be uplinked and transmitted and then received by the remote terminal unit at the same time that content data from memory is being played from memory. In this third mode of operation, the interleaving capabilities described above allow for interleaving of incoming content data that is being written to memory with the reading from memory of previously stored content data. Accordingly, the writing to memory of new content data at the same time period that previously stored memory is read from memory is achieved without repeating transmissions, corruption of data or perception by a listener. It is within the scope of the present invention that content data segments may be transmitted over a single channel and that the channel be split to play "live" feeds of content data while the same content data is stored in memory. In the depicted embodiment, however, there are two channels. In the depicted embodiment, a first "live" feed may proceed over a first channel and follow a direct path for play, while content data that is to be stored in memory may be transmitted and received over a second channel and follows the previously indicated path for storage. Alternatively, the second channel feed may be split for interleaved storage and play, while the first channel plays directly.

Loss of Signal

Loss of signal is a recurring problem in content data distribution networks. Damage to cables, ground based broadcasting antennas, receiving satellite dishes or even—in the case of satellite broadcasted networks—simple rain showers, can all interrupt the "live" feed of content. The memory control system of the present invention solves this problem by playing stored content data from memory. Hence, the memory control system enables at least two further modes of operation. They include storing memory and playing the stored content data from memory when a loss of signal occurs.

Content data is stored in memory in an amount corresponding to a preconfigured duration of playing time, for example thirty minutes. The "backup" content data, for example music, can be received in a variety of manners, for example as a split from the "live" feed. In the depicted embodiment a second channel is received. Accordingly, in the depicted embodiments, the first channel carries a live feed of music to play continuously. Content to be stored is broadcast over a second channel and stored directly into memory 208, with its address information stored in the File Allocation Table in memory 210, along with its control instructions, if any. The stored memory may include simply content data of a first type, for example music, or may contain content data of multiple types, for example music and commercial messages. If the memory control system of the present invention is deployed in a receiver system that allows an end user to play each of two channels separately, the second channel can store and play concurrently. This is done at the download rate at which the content data is received. For example, a music subscriber may play rock music from the first channel in the restaurant of his establishment, play country music from the second channel in the bar section, and store the country music.

During the storing of content data in memory, it is likely that previously stored control instructions will call up for play a previously stored segment of content, for example a commercial. The interleaving method of the memory control system described above enables both the writing of the backup memory and the reading of a scheduled commercial from memory to occur serially. However, as described, it is critical to the operations that there will be no interruption perceptible to humans listening to or viewing displayed content in real time. An additional advantage of the disclosed embodiment is that a central uplink need not be adapted to accommodate the schedules, memory playback instructions or other unique circumstances of any individual receiving unit or group of receiving units. Consequently, the broadcast programmer at the uplink can transmit a commercial for remote unit storage with instructions for a later playback schedule and no further uplink transmissions will be necessary. The uplink programmer can also schedule backup memory storage of content data with a single instruction to execute the memory backup on a periodic basis. Neither commercial storage instruction nor the loss of signal backup memory instruction need be altered to accommodate the other, scheduled to avoid each other, or amended to accommodate the circumstances of various receiving units. Remotely stored control instructions make memory playback self executing. Interleaving through the memory control system enables serial storing and reading of content data in memory, but at a rate that can be perceived as simultaneous in real time playback.

In a typical deployment of the memory control system content data is stored in memory on a periodic basis. For example, an hour of backup would be created every 25 hours. (By designating a backup period that is offset from a standard content loop, such as 24 hours of recorded music, the stored content will always contain relatively fresh material.) Hence, the stored content data is not a permanent back up memory, but rather stored content data to be used during a loss of signal. It is refreshed or replaced periodically.

When a loss of signal occurs, the content data stored in memory is called up and executed through the CSOC chip and output for play to speakers, video display or otherwise. The backup memory may play various types of content data, for example music and commercials, as a single unit of stored content. In the depicted embodiment however, the first logical memory would contain stored content data of a first type, for example music, and a second logical memory would contain a second type of content data, for example commercials. Separate storage may be in a single memory chip, or different chips. Additional chips may expand memory. During a loss of signal mode playback of music, the control instructions for scheduling commercial playback would simply proceed as they would during play of "live" music. The backup music would fade, the commercial would play, and after the commercial is over the stored music would be faded back to volume.

Figure 4:
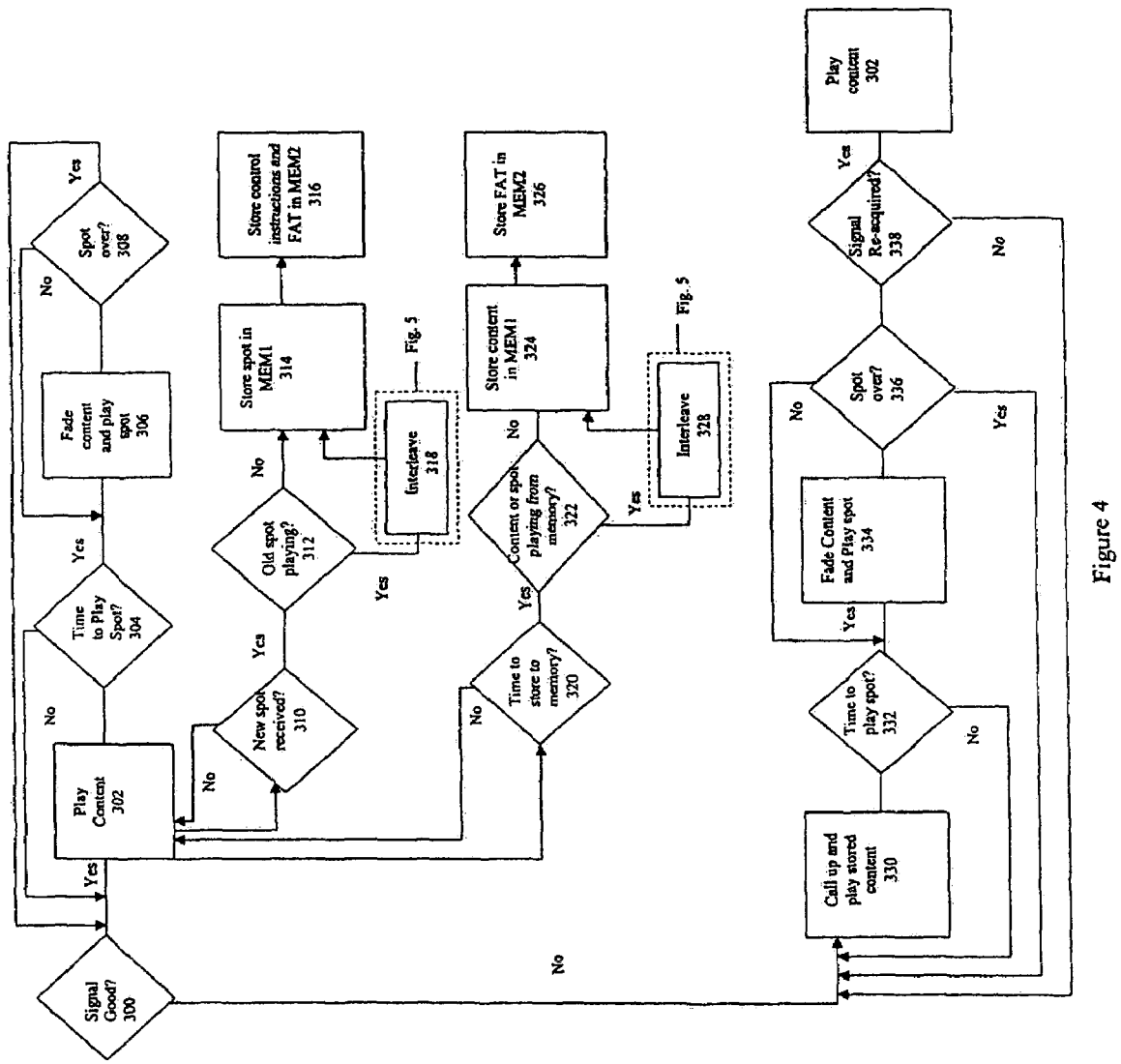
FIG. 4 is a flow chart illustrating interleaving, storage and loss of signal procedures.

In operation, the logic of the CSOC of the depicted embodiment proceeds according to the flow chart depicted in FIG. 4. First, the CSOC chip receives a signal from the receiver, indicating whether or not the incoming content signal is good 300. Alternatively, the CSOC may determine the sufficiency of the signal itself. If the signal is good, the content is played 302. Next the system checks the time against the control instructions for scheduling play back of commercial content from memory. Commercials, advertisements, promotions, announcements and the like are sometimes referred to by those skilled in the art as a "spot." If it is not time to play a spot 304, content play continues. If it is time to play a spot, content is faded and the spot is played 306. Next it is determined if the spot is over 308. If not, spot play continues over faded music. If the spot is over, regular content play is returned to volume and play continues.

As content continues to be received, it is next determined if a new spot is also being received 310. If not, play continues. If a new spot is being received, the system determines if an old spot or old content is being played 312. If no old content is being played, the new spot is stored in the first memory 314 and its control instructions and addresses are stored in the File Allocation Table in the second memory 316. The first memory corresponds to memory 208 in FIG. 3 and "MEM1" in FIG. 4. The second memory corresponds to memory 210 in FIG. 3, and "MEM2 in FIG. 4. If the new spot is received at the time content is being played from memory, whether that content be an old spot or "backup" music, the interleaving process is undertaken to continue the play of the content from memory and store the new spot in content memory and stops its control instructions and address in the second memory. The system will store a new version of a commercial spot even if the previous version of the same spot happens to be playing when the new version is received. The interleaving process is detailed in FIG. 5.

As play continues at 302, the control system receives checks for a stored control instruction or a downlink transmitted instruction to store "backup" content to memory 320 for loss of signal episodes. If it is not time to store loss of signal memory, play continues with box 302. If it is time to store to memory, the control system checks to see if a spot or content is being played from memory 322. If not, memory is backed up with content allocated to the first memory 324 and addresses stored in the File Allocation Table in the second memory 326. If the embodiment is deployed such that stored memory may contain control instructions or spots with their own control instructions, these control instructions are also stored in the second memory 326.

Upon loss of signal 300 the control system will proceed to call up and play stored content from memory, 330. As with "live" play, the control system periodically checks for the receipt of an instruction to play a spot 332. If it is not time, play of the loss of signal content from memory continues. If it is time, the loss of signal content is faded and the spot plays 334. If the spot is not over 336, playing the spot continues and if the spot is over, the "backup" content from memory is faded back up to volume and play continues.

Periodically the control system will check to see if a good signal has been re-acquired. The system may check for this by monitoring incoming channels from the receiver, or the system may be configured such that the receiver checks for new signal and sends an instruction to the CSOC that the signal has been re-acquired. If the signal has not been re-acquired 338 loss of signal backup content continues to play 330. If the signal has been re-acquired, its contents are played and the status returns to content play box 302.

During loss of signal and while content memory is played back from memory, a routine is initiated to determine if a good signal has been re-acquired. In the described embodiment, this routine would be executed by the controller of the receiver/decoder unit. The routine would then send a signal to the CSOC chip of the memory control system indicating that the signal had been re-acquired, or not. Alternatively, the signal may be processed through a routine executed by the CSOC chip. In either case, the signal is checked periodically. When a signal is received, it is tested for duration and quality. The routine times the uninterrupted duration of a signal. If its continuity is sufficiently long, that is, if it exceeds a pre-configured threshold, it is checked for error content. Error detection systems are known, as set forth in the Pelkey patent, U.S. Pat. No. 4,985,895, incorporated by reference herein. The routine checks to see if the signal received is at or below an acceptable error incidence threshold, which is set at a preconfigured level. If the amount of errors being received from a re-acquired signal is sufficient, as determined by compliance with the threshold, the re-acquisition of signal indicator is sent to the CSOC and memory control system. Thereupon, play of loss of signal content from memory is ended and play of the "live" feed is reinitiated. If the signal is poor quality, that is the number of errors being received from a re-acquired signal is in excess of the preconfigured acceptable threshold, the receiver continues to signal the CSOC that the signal has not been re-acquired. Obviously, duration and quality of signal may be checked in either order; concurrently, or in conjunction with other tests.

Figure 5:
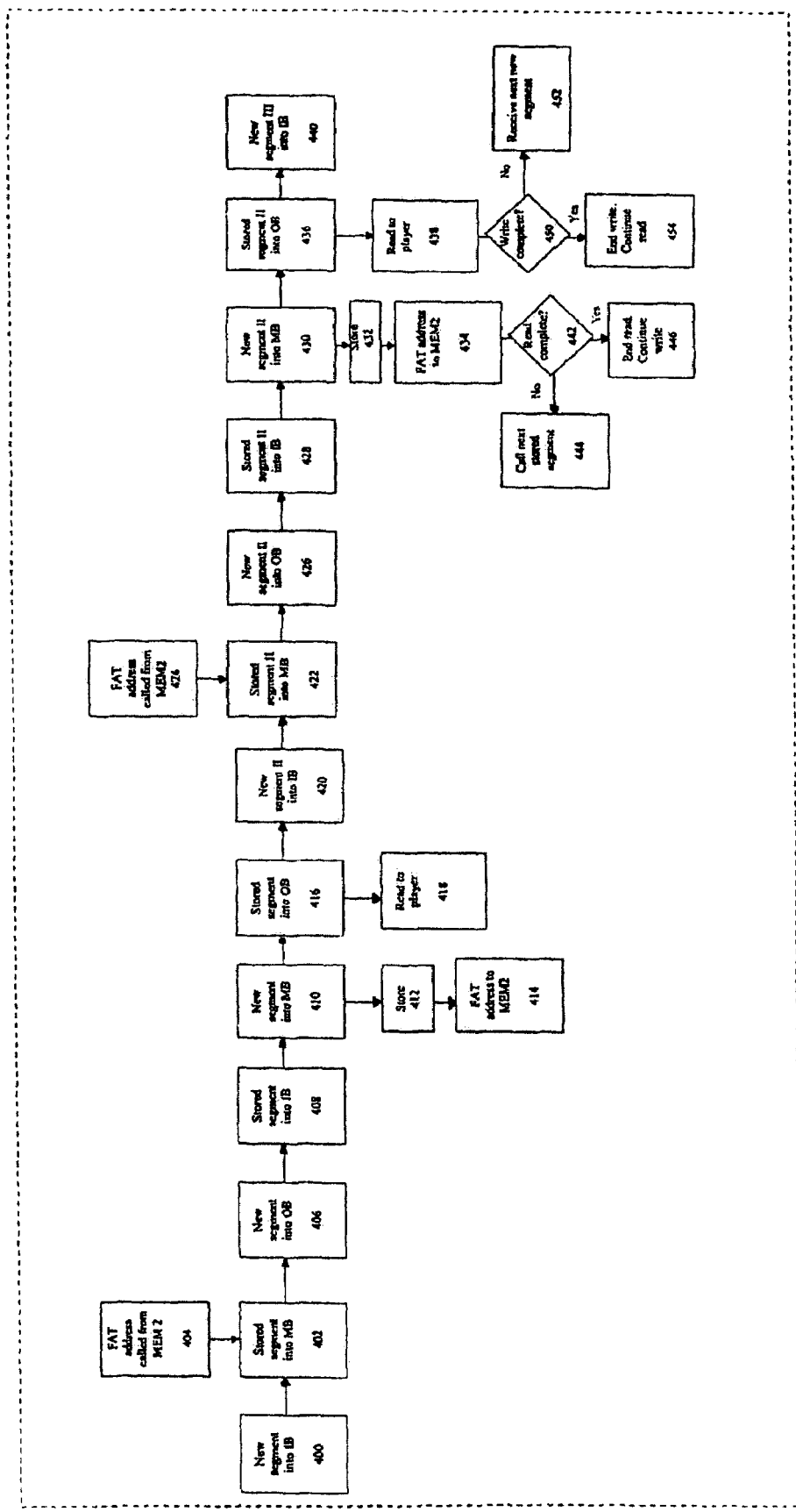
FIG. 5 is a flow chart illustrating interleaving in detail.

FIG. 5 is a flow chart for the interleaving process. Those skilled in the art will recognize that, because of the rotating nature of the interleaving process, it may be initiated at various steps of the process. For example, if a commercial "spot" is being played, and a new spot is received during the play back of the stored spot, interleaving will begin with a portion of a new content data interrupting the flow of stored content data on its read path through the various buffers. Conversely, if new data is being received and stored to memory and a control instruction prompts the micro processor to call up and play other stored content data, the call up of stored data will interrupt the flow of the new content data being written to memory along the same path. The memory control system will arbitrate the alternating flow of data being read with data being written by controlling several variables.

The interleaving process alternates reading data flow along a path with writing data flow along the path. Both paths include the input buffer 202, output buffer 204 and a memory buffer (not shown) contained in memory 208. The path of new content data being received for writing into storage in the memory 208 is into input buffer 202, then to output buffer 204 and finally to the memory buffer in memory 208, from where it is stored. The read content data flow path is from memory 208 to the same memory buffer then to the same input buffer 202, the same output buffer 204 and then out to the output device that plays the content data.

Of course, to move content data being written or read along the data path, the microprocessor 206 must first call up from the File Allocation Table in memory 210 an address for content data to be read from memory 208. It must likewise store in memory 210 the File Allocation Table address given to incoming content data being written to memory 208. It will be understood by those skilled in the art that calling a FAT address from memory 2 and storing a new memory FAT address to memory 2 is executed through microprocessor 206.

Content data is divided into segments. In the memory control system of the present invention, the segments are preconfigured to correspond to the capacity of the buffers and data transfer rate of the receiver/decoder terminal into which the system is incorporated. Accordingly, incoming content data to be written to memory is received in segments, which are designated "new segments" in FIG. 5. Content data being read from memory is read in segments that are designated "stored segments" in FIG. 5.

Referring now to FIG. 5, first a new segment of incoming data to be written to memory 400 is received into input buffer 202 ("IB"). According to steady state cycling of the interleaving process, when input buffer 202 is filled with a new segment, a memory buffer ("MB") fills with a stored segment to be read. Accordingly, a stored segment is saved into the memory buffer at step 402. In order that the storage segment be entered into the memory buffer according to step 402, the storage segment must be recalled from its address in memory 208. In order to do so, the microprocessor 206 must have called up the FAT address for that storage segment from memory 210. This step is indicated at 404. The previously referenced new segment is next entered 406 into output buffer 204 ("OB"). It is within the scope of the present invention that the herein described steps may either be entirely alternating or may overlap. Microprocessor 206 may be programmed to execute interleaving in a relatively simple alternating manner, or may be programmed to optimize speed by beginning a next step during execution of a previous step. Further optimization may be had by measuring the amount of data in a segment, so that a next step may proceed immediately upon completion of a segment that was not full.

The stored segment of content data is entered 408 into the input buffer 202, which has been rendered available by the new segment having proceeded into output buffer 204 in step 406. Similarly, the new segment is next entered 410 into the memory buffer. Execution of this step will render the output buffer 204 empty and available. On completion of step 410 the memory buffer will contain the new content data segment. When new content data segment has been completely written to the memory buffer, it is then stored 412. Storing necessarily includes the step of memory 208 returning to the microprocessor 206 a FAT address locating the placement of the new content data segment in memory 208. The FAT address is stored by microprocessor 206 into memory 210 at step 414.

The output buffer 204 being rendered available by the previous step (410), the stored segment is next entered 416 into the output buffer 204. The stored segment to be read is next directed by microprocessor 206 to the output device—a stereo amplifier or video player—to be played 418. Hence a first segment of new content data has been written to memory in an interleaved fashion with a previously stored content data segment being read to output. This process repeats. A new segment of received content data, "new segment II" is entered 420 into the input buffer 202. A stored segment FAT address is called from the second memory 424 and the stored segment is retrieved and entered into the memory buffer 422. The new segment II is entered 426 into the output buffer, the "stored segment II" is entered 428 into the input buffer. The new segment II is entered 430 into the memory buffer. From there it is stored 432 and the FAT address is returned to microprocessor 206 for storage in memory 210 according to step 434. Stored segment II is entered 436 into the output buffer, and from there it is read to the output player 438.

The process then cycles with a third new segment being entered into the input buffer 440. As FIG. 5 makes apparent, this interleaving process will continue until either the reading of stored content data or the writing of newly received content data to storage has completed the processing of all segments. Accordingly, FIG. 5 indicates a microprocessor check after each new segment has been stored and after each storage segment has been read. After a stored segment is output, the microprocessor checks if the read has been completed 442. If it is not, the next segment is called 444. If the read is complete, the read ends and the write process continues 446. After each step of the new segment being stored, the microprocessor 206 checks to see if the write is complete 450. If it is not the next segment of new content data is received into the input buffer 452. If the write is complete, the write cycle is ended and the read cycle continues if necessary, 454.

The microprocessor may simply alternate read and write steps, or it may optimize. The write process may prove slower than the read process, for example. To accommodate that, the microprocessor may allocate two or more read steps for each write step.

File Allocation Tables

Another aspect of the memory control system embodiment disclosed herein is an algorithm for storing addresses in File Allocation Tables according to available memory locations. Flash memory chips have a limited life span. Rewriting a single memory location of flash memory repeatedly will eventually render that location inoperable. In order to preserve the usable life span of the flash memory chips used in the depicted embodiment, the hereinafter disclosed storage algorithm avoids repeated rewrites of an initial memory location in favor of sequentially searching for unused locations into which to write new data. Initial locations are only rewritten upon occurrence of relatively infrequent events, such as a commercial spot being discarded. This algorithm represents a departure from conventional ATA-IDE control of memory storage.

Memory locations are grouped in File Allocation Tables. The number of FA tables may vary, provided that there are at least two. Table size may vary. In the disclosed embodiment, there are six tables. Each FA table contains 32K bytes. Memory locations are large enough to store sector tables having address information to locate content data in memory 208.

A content memory 208, which in the depicted embodiment is a 32M×8 flash memory, stores content data in over 16,000 "sectors." Each sector is about 2,000 bytes and therefore corresponds to approximately a ¼ second of music for an audio application. (Again, it is within the scope of the present invention to use other size sectors and other size memories as may be more appropriate to other applications, such as video, at other data transfer rates.) Address and File Allocation Table memory 210 is a 1M×8 flash memory. The flash memories are divided into 64K byte segments, each having a 32K boundary. In the disclosed embodiment of the present invention, six FA tables are created by dividing three 64K segments in memory 210 at their 32K boundary. Although 32K bytes are reserved per table, the present embodiment typically uses only 16,000 to 17,500 bytes, leaving the rest in reserve. In the flash memory, an entire 64K byte segment is erased at a time.

Each of these FA tables has a header byte indicating the status of the FA table. This header is one byte. At a minimum, the header will indicate that the table is valid and can be used, or is invalid. In the depicted embodiment, the header byte contains more complex information. As flash memory is normally set in its unwritten status as a "1" in each gate, the header byte will indicate all 1s for a FA table that has not had anything written to it yet. In hexadecimal terms, the header byte reads "FF." If the table is in the process of being written to, the header byte reads F5. This is not a "valid" status allowing addresses to be read from the table at the time that other addresses are being written in. The next status heading would be 55, which is a valid FAT table ready for use. A discarded FAT table has a status byte reading 0. Because a full byte is dedicated to FAT status, further status complexity may be programmed in if desired; for example, an indication that an error check is in progress may be useful.

In the depicted embodiment each table has a capacity for 64 "spots." Again, "spots" refer generally to commercial content such as advertisements, announcements and the like. With regard to the FAT logic herein disclosed, a "spot" would also refer to the loss of signal memory content. Each spot has eight bytes reserved for FAT table spot information. The header byte containing the status information is the first byte.

The next two bytes for each spot memory location in the File Allocation Table comprise a cross-reference table for the spots. As each spot is received, its address information is stored in the next available memory location among the 32 locations in each table. Of course incoming content data from the uplink includes headers with identification bytes. Because the entire broadcast network system handles more than 64 advertising spots, its header bytes are designed to identify advertisement spots with numbers from 1 to 65,533. Accordingly, the cross reference table provides the necessary function of correlating the uplink ID number header information with spot location numbers from 1 to 64 in the FA table. Two bytes of the 8 reserved bytes for each spot location serve this function.

Advertisements frequently have different versions. The next byte in the spot memory location in memory 210 is a version number from 0-255. Control instructions are variable by version.

Another byte of the 8 bytes reserved for each advertisement spot will comprise a data type byte. Typically advertising spots are received in Elementary Data Stream according to the MPEG protocol. The lose of signal content data, by contrast, is received in Packetized Elementary Data Stream, also according to the MPEG protocol. The data type byte identifies which data stream corresponds to the spot. Alternatively, it may contain other data type information for other content in other protocols.

For purposes of File Allocation Table logic, the Loss of Signal content data memory is identified as another spot. LOS content carries an up link ID number of 65,534, one more than the ID numbers reserved for the commercial spots. It is written to one of the 64 FAT locations upon receipt, like the commercial spots. Unlike the commercial spots, LOS has no version number, and is larger. Unlike the commercial spots, LOS is overwritten periodically without deleting the previous LOS FAT data. That is, LOS content is replaced in the same sectors of memory 208 that stored the previous LOS content. Accordingly, the FA table addresses remain the same. Commercial spot addresses change when a new version replaces an old version.

The remaining 2 bytes in each spot memory location are reserved for further identification, location and functional data that may be applicable to this or other applications.

Figure 6:
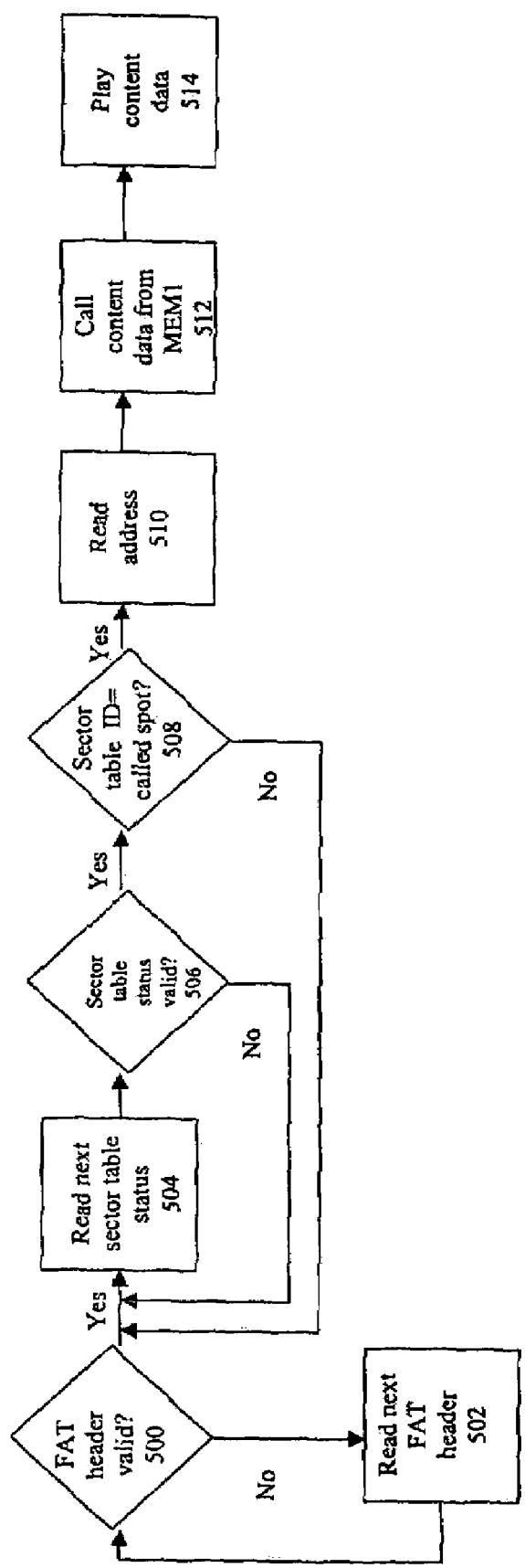
FIG. 6 is a flow chart illustrating reading from File Allocation Tables.

The FA tables finally contain sector tables. Since each File Allocation Table holds 64 commercial spots, the allocated numbers 1-64 in the cross reference table will correspond to particular commercial spots. The sector table associated with each numbered commercial spot header contains the addresses of the multiple 2000 byte sectors in memory 208 holding the content data that together comprise a commercial spot." There may be 64 sector tables in each FA table. Each sector table also has a status byte. Like the FAT header byte, the sector table status byte may indicate "FF" (or 255 in decimal notation) for a blank segment of the table that has not been written to yet. A sector table status byte having an ID number of 67 is designated as a "bad" address. A bad address is one that has been discarded or has an error in it. The discarded address may have been replaced by an advertiser, or moved at the uplink for any reason or may have simply been cancelled. Once again F5 may indicate that the segment is being written and is therefore not yet valid, and 55 may indicate that the sector table is valid and ready to read. Accordingly, in operation, in response to a control instruction to play a spot from memory, the FA table header bytes are reviewed in sequence as indicated at 500 in FIG. 6. An FA Table will only be searched if a status byte reads 55, indicating that the table is valid. Invalid tables are passed, and the next File Allocation Table is checked, 502.

For each valid FAT table in sequence, the status byte of each spot memory location segment is reviewed 504. If the status byte for that sector table indicates 55, it is valid, 506, and the other bytes in its header will be read. Then, if the cross-reference information corresponds to the spot requested, 508, the sector table is read for its content data addresses, which are then used to call up the spot 512 for play 514. If not, the next FAT table will be reviewed for the spot memory location corresponding to the called for spot.

When a spot is discarded, its memory location in the FAT table is found and its status header is changed to 0. On a periodic basis, for example every 10 seconds, each FA table is reviewed by the algorithm of the present invention to check for status bytes containing a 0. That is, each FA table is checked for discarded advertisements. If all the status bytes indicate that the sector tables corresponding to commercial spots are either valid or blank, no action is taken. When a status byte for a FAT memory location segment is found reading 0, for a discarded spot, the following action is taken. The entire FAT table is scanned for valid spots. The valid spots are rewritten to the next File Allocation Table. Invalid spots are not rewritten. Blank spots are passed over. Accordingly, only valid spots are written into the next FA table. That FA table will also include blank spots allowing for a continuing capacity for the receipt of new commercial spots. The blank spot memory locations in the new FA table are subsequent to the rewritten spots. After rewriting the new FA table into the next flash segment is completed, the previous FAT 64K segment is erased in its entirety. Alternatively, the FAT status check may be triggered by an event, such as replacement of an existing spot, rather than being periodic.

By use of this algorithm, no individual spot memory location in memory is erased and rewritten enough times to degrade its functionality. No erasing occurs unless a spot has been discarded, which may be reliably expected to occur on the order of a daily basis. Rewriting proceeds according to the next available segment space, as opposed to dedicated spaces, and accordingly no individual segment is overburdened with many write and erase cycles. Use of this algorithm allows a useful degree of memory control incorporating the use of components that are substantially less expensive than IDE control of hard drives.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A memory control system for network distributed content data comprising:
   an input buffer;
   an output buffer;
   a first memory storing content data;
   a second memory for storing File Allocation Tables and control instructions;
   a read/write control data structure that interleaves
      reading content data to be played from said first memory into said input buffer and out to said output buffer and from said output buffer to an output device, with
      writing content data to be stored into said input buffer and to said output buffer and from said output buffer to said first memory,
   wherein said content data to be stored to said first memory is stored in an amount corresponding to a preconfigured duration of playing time; and
   wherein said memory control system provides a data output that maintains uninterrupted real time play.

2. The memory control system of claim 1 wherein said input buffer, said output buffer, and said control data structure are embodied in at least one integrated circuit selected from the group consisting of: a Field Programmable Gate Array, a Configurable System on a Chip, a System on a Chip and an Application Specific Integrated Circuit.

3. The memory control system of claim 1 wherein said input buffer, said output buffer, said control data structure, said first memory storing content data and said second memory are an option card that operatively communicates with a receiver/decoder.

4. The memory control system of claim 3 further comprising a separate output from an output in said receiver/decoder.

5. The memory control system of claim 1 wherein said content data is music data encoded according to an MPEG protocol.

6. The memory control system of claim 1 wherein said content data is video data encoded according to an MPEG protocol.

7. The memory control system of claim 1 wherein said content data to be stored is periodically refreshed.

8. A memory control system for a broadcast content network receiver comprising:
   a configurable system on a chip comprising:
      an input buffer,
      an output buffer,
      a microprocessor;
   a first flash memory;
   a second flash memory;
   said configurable system on a chip being configured to play current content data on a first channel and to monitor said play of said current content data for loss of signal;
   said configurable system on a chip also being configured to receive on a second channel content data for storage, said first flash memory storing said content data for storage and said second flash memory storing address information for said content data for storage;
   said configurable system on a chip also being configured to play said content data for storage from said first flash memory;
   wherein said play and said storage of said content data for storage may be executed concurrently such that stored content data output maintains uninterrupted real time play.

9. The memory control system of claim 8, wherein said content data for storage is back up content.

10. The memory control system of claim 9, wherein said configurable system on a chip monitors said play of said current content data for loss of signal by testing the duration and error rate of said signal.

11. The memory control system of claim 8, wherein said content data for storage is commercial content data.

12. The memory control system of claim 8 wherein said content data for storage is played upon a loss of a signal carrying said current content data.

13. The memory control system of claim 8 further comprising a data structure for reacquiring said signal after said loss of signal.

14. The memory control system of claim 13 wherein said data structure for reacquiring said signal after said loss of signal tests an initial reacquisition of said signal for duration and error rate.

15. The memory control system of claim 8 further comprising a parallel/serial shift register for output.

16. A receiver for network distributed content data comprising:
an input buffer;
an output buffer;
a first memory, said first memory being configured to store content data;
a second memory, said second memory being configured to store at least one File Allocation Table and to store at least one control instruction; and
a processor, said processor being in operative communication with said input buffer, said output buffer, said first memory and said second memory, and said processor being configured to interleave
a reading of content data to be played from said first memory into said input buffer and out to said output buffer and from said output buffer to an output device, with
a writing of content data to be stored into said input buffer and to said output buffer and from said output buffer to said first memory,
wherein said content data to be stored to said first memory is stored in an amount corresponding to a preconfigured duration of playing time; and
wherein said memory control system provides a data output that maintains uninterrupted real time play.

17. A memory control system for a broadcast content network receiver comprising:
a configurable system on a chip comprising:
an input buffer,
an output buffer,
a microprocessor;
a first flash memory;
a second flash memory;
a sector table, said sector table being configured to hold addresses corresponding to a location in said first flash memory for each of a plurality of sectors of said content data;
a header byte, said header byte being associated with said sector table and said header byte indicating that said sector table is valid or invalid;
a first file allocation table, said first file allocation table being in said second memory, said first file allocation table having a marker byte, said marker byte indicating that said file allocation table is valid or invalid, said first file allocation table being configured to receive an allocation of said sector table;
said configurable system on a chip being configured to play current content data on a first channel and to monitor said play of said current content data for loss of signal;
said configurable system on a chip also being configured to receive on a second channel content data for storage, said first flash memory storing said content data for storage and said second flash memory storing address information for said content data for storage;
said configurable system on a chip also being configured to play said content data for storage from said first flash memory;
wherein said play and said storage of said content data for storage are interleavable in that said play and said storage may be executed concurrently such that stored content data output maintains uninterrupted real time play.

18. The memory control system of claim 17 wherein said configurable system on a chip is configured to receive a call up instruction for playing a particular portion of content data; and
being further configured to read said first file allocation table marker byte; and
being further configured to read said sector table in said first file allocation table if said file allocation table marker byte is valid; and
being further configured to call or play said multiple sectors from said first memory that correspond to said particular portion of content data if said header byte of said sector table is valid and if said header byte identifies said one of said sector tables as corresponding to said particular portion of content data.

19. The memory control system of claim 17 wherein said configurable system on a chip is further configured to check said file allocation table for invalid sector tables; and
said configurable system on a chip being further configured to write said sector tables that are valid according to said header bytes to a second file allocation table in a second memory when an invalid sector table is discovered; and
said configurable system on a chip being further configured to erase said first file allocation table.

20. The memory control system of claim 17 wherein said system is configured to execute periodically.

21. The memory control system of claim 17 wherein said system is configured to execute in response to a discarding of any content data.

22. The memory control system of claim 17 wherein said invalid designation in said marker byte is a designation selected from the group consisting of: being blank, being written, being checked for errors and being discarded.

23. The memory control system of claim 17 wherein said invalid designation in said header byte is a designation selected from the group consisting of: being blank, being written, being checked for errors and being discarded.

24. A memory control system for network distributed content data comprising:
an input buffer;
an output buffer;
a first memory;
a sector table, said sector table being configured to hold addresses corresponding to a location in said first memory for each of a plurality of sectors of content data;
a header byte, said header byte being associated with said sector table and said header byte indicating that said sector table is valid or invalid;
a second memory for storing at least one file allocation table and control instructions, wherein said at least one file allocation table has a marker byte, said marker byte indicating that said at least one file allocation table is valid or invalid, said at least one file allocation table being configured to receive an allocation of said sector table;
a read/write control data structure that interleaves
reading content data to be played from said first memory into said input buffer and out to said output buffer and from said output buffer to an output device, with
writing content data to be stored into said input buffer and to said output buffer and from said output buffer to said first memory.

* * * * *